(12) United States Patent
Jakobsson

(10) Patent No.: US 8,973,102 B2
(45) Date of Patent: Mar. 3, 2015

(54) SYSTEMS AND METHODS FOR AUTHENTICATING A USER AND DEVICE

(75) Inventor: Bjorn Markus Jakobsson, Mountain View, CA (US)

(73) Assignee: eBay Inc., San Jose, CA (US)

( * ) Notice: Subject to any disclaimer, the term of this patent is extended or adjusted under 35 U.S.C. 154(b) by 4 days.

(21) Appl. No.: 13/523,425

(22) Filed: Jun. 14, 2012

(65) Prior Publication Data

US 2013/0340052 A1 Dec. 19, 2013

(51) Int. Cl.
- G06F 7/04 (2006.01)
- H04L 29/06 (2006.01)
- G06F 21/33 (2013.01)
- G06F 17/30 (2006.01)

(52) U.S. Cl.
CPC ..................... *G06F 21/33* (2013.01)
USPC ............... 726/4; 726/28; 726/29; 713/155; 713/168; 713/183; 713/184; 713/185; 713/186

(58) Field of Classification Search
CPC .......... G06F 21/316; G06F 2221/2113; G06F 2211/009; G06F 2221/2111; H04L 63/107; H04L 63/105
USPC ........... 726/4, 28, 29; 713/155, 168, 183–186
See application file for complete search history.

(56) References Cited

U.S. PATENT DOCUMENTS

| | | | |
|---|---|---|---|
| 7,039,951 B1 * | 5/2006 | Chaudhari et al. ............... 726/7 |
| 7,086,085 B1 * | 8/2006 | Brown et al. ..................... 726/7 |
| 7,373,669 B2 | 5/2008 | Eisen | |
| 7,545,961 B2 * | 6/2009 | Ahern et al. ................... 382/115 |
| 7,853,250 B2 * | 12/2010 | Harvey et al. ................. 455/421 |
| 8,065,227 B1 * | 11/2011 | Beckman ........................ 705/39 |
| 8,151,327 B2 | 4/2012 | Eisen | |
| 8,312,540 B1 * | 11/2012 | Kahn et al. ...................... 726/22 |
| 8,437,742 B2 * | 5/2013 | Garskof ......................... 455/411 |
| 2004/0083394 A1 * | 4/2004 | Brebner et al. ............... 713/202 |
| 2004/0103310 A1 * | 5/2004 | Sobel et al. ................... 713/201 |
| 2004/0103317 A1 * | 5/2004 | Burns ........................... 713/201 |
| 2004/0107360 A1 * | 6/2004 | Herrmann et al. ............ 713/201 |

(Continued)

OTHER PUBLICATIONS

Chow, Richard, et al. "Authentication in the clouds: a framework and its application to mobile users." Proceedings of the 2010 ACM workshop on Cloud computing security workshop. ACM, 2010.*

(Continued)

*Primary Examiner* — Michael Simitoski
(74) *Attorney, Agent, or Firm* — Haynes and Boone, LLP

(57) ABSTRACT

Systems and methods for authenticating a user request for authentication are provided. An authentication device that may be part of such a system includes a network interface component coupled to a network and configured to receive at least one data packet having authentication information including at least a username of a user and user credentials. The device also includes a memory coupled to the network interface component and configured to store the received authentication information, one or more instructions for authenticating the user, and account information of the user. The device further includes one or more processors configured to analyze the received information, calculate a score based on the received information, determine a threshold, compare the calculated score with the determined threshold, and authenticate the user and a device from which the data packet is received if the calculated score is greater than or equal to the determined threshold.

19 Claims, 4 Drawing Sheets

(56) References Cited

U.S. PATENT DOCUMENTS

| | | | |
|---|---|---|---|
| 2004/0210771 A1* | 10/2004 | Wood et al. | 713/201 |
| 2004/0250107 A1* | 12/2004 | Guo | 713/200 |
| 2005/0039057 A1* | 2/2005 | Bagga et al. | 713/202 |
| 2005/0177724 A1* | 8/2005 | Ali et al. | 713/168 |
| 2005/0228874 A1* | 10/2005 | Edgett et al. | 709/220 |
| 2005/0268100 A1* | 12/2005 | Gasparini et al. | 713/170 |
| 2005/0268107 A1* | 12/2005 | Harris et al. | 713/182 |
| 2006/0200856 A1* | 9/2006 | Salowey et al. | 726/5 |
| 2007/0055752 A1* | 3/2007 | Wiegand et al. | 709/220 |
| 2007/0055871 A1* | 3/2007 | Ghanea-Hercock | 713/168 |
| 2007/0130473 A1* | 6/2007 | Mazotas | 713/183 |
| 2007/0266257 A1* | 11/2007 | Camaisa et al. | 713/182 |
| 2008/0010678 A1* | 1/2008 | Burdette et al. | 726/15 |
| 2008/0162338 A1* | 7/2008 | Samuels et al. | 705/38 |
| 2009/0199264 A1* | 8/2009 | Lang | 726/1 |
| 2009/0210939 A1* | 8/2009 | Xu et al. | 726/19 |
| 2009/0254975 A1* | 10/2009 | Turnbull et al. | 726/3 |
| 2009/0327131 A1* | 12/2009 | Beenau et al. | 705/44 |
| 2010/0005508 A1* | 1/2010 | Yang | 726/2 |
| 2010/0037046 A1* | 2/2010 | Ferg et al. | 713/155 |
| 2011/0016534 A1* | 1/2011 | Jakobsson et al. | 726/28 |
| 2011/0082768 A1 | 4/2011 | Eisen | |
| 2011/0225625 A1* | 9/2011 | Wolfson et al. | 726/1 |
| 2011/0314549 A1* | 12/2011 | Song et al. | 726/25 |
| 2012/0023556 A1* | 1/2012 | Schultz et al. | 726/4 |
| 2012/0137340 A1* | 5/2012 | Jakobsson et al. | 726/1 |
| 2013/0031598 A1* | 1/2013 | Whelan et al. | 726/1 |
| 2013/0036458 A1* | 2/2013 | Liberman et al. | 726/6 |
| 2013/0042327 A1* | 2/2013 | Chow | 726/28 |
| 2013/0047227 A1* | 2/2013 | Schultz et al. | 726/7 |
| 2013/0055370 A1* | 2/2013 | Goldberg et al. | 726/7 |
| 2013/0125211 A1* | 5/2013 | Cashman et al. | 726/4 |
| 2013/0263224 A1* | 10/2013 | Peters et al. | 726/4 |

OTHER PUBLICATIONS

Jakobsson, Markus, et al. "Implicit authentication for mobile devices." Proceedings of the 4th USENIX conference on Hot topics in security. USENIX Association, 2009.*

Shi, Elaine, et al. "Implicit authentication through learning user behavior." Information Security. Springer Berlin Heidelberg, 2011. 99-113.*

* cited by examiner

SYSTEMS AND METHODS FOR AUTHENTICATING A USER AND DEVICE

BACKGROUND

1. Technical Field

Embodiments disclosed herein are related to systems and methods for authenticating a user and device with information in addition to a username and password. In particular, embodiments disclosed herein are related to a system and method for authenticating a user and a device with low-quality or low-entropy information supplied in addition to a username and password.

2. Related Art

As people use the internet for more and more reasons, scammers and so-called "black-hat" hackers increasingly look to the internet as a new frontier of illicit opportunity. People who use the internet to conduct financial transactions, such as making purchases and banking, can be attacked by the scammers and hackers, and attackers can gain access to the online financial accounts of these people. The attackers can use this access for their financial gain, which can hurt the financial standing and credit rating of the people. Moreover, access to one account of a person may result in access to additional accounts because of the exploitable personal information viewable in the accessed account.

In some cases, attackers may know a user's login or password, but not both. As a result, an attacker may try a brute force attack by entering common passwords with a known username, or common or user-identifiable (i.e., jdoe1) usernames with known or common passwords. Passwords with few characters, such as a common four-character personal identification number (PIN), may be particularly vulnerable to brute force attacks because there are few permutations, and many common PINs are used by users for their convenience. One method to stop brute force attacks is to limit the rate at which an attacker can make password guesses, such that the account is disabled after a certain number of incorrect guesses. However, this method disables the account associated with a particular username, and cannot prevent attacks that enter a common password with many different usernames, which is referred to as a "vertical attack". For example, in many cases a PIN number of 2580 is very common because it is simply the center row of numbers on a keypad. An attacker having a list of usernames can try that PIN number (or other common PIN numbers) on each of the usernames, and may have some moderate level of success.

The variety and portability of internet-capable devices have resulted in not only users being capable of performing internet communications and transactions more frequently, but also in the opportunity for attackers to attempt attacks on unsuspecting users. The lucrative potential that these attacks present the attackers encourages attackers to try and stay one or more steps ahead of the security. When a countermeasure or other security provision is put into place to stop or otherwise limit the effect of an attack, the attackers develop ways to overcome the countermeasure, or find additional ways to exploit the operating system, browser or other executable software to launch another, possibly more effective attack.

Accordingly, there is a need for a system and method for authenticating a user using low-quality or low-entropy information supplied in addition to a username and password.

SUMMARY

Consistent with some embodiments, there is provided an authentication device. The device includes a network interface component coupled to a network and configured to receive at least one data packet having authentication information, the authentication information including at least a username of a user and user credentials. The device also includes a memory coupled to the network interface component and configured to store the received authentication information, one or more instructions for authenticating the user based on the received authentication information, and account information of the user. The device further includes one or more processors configured to, analyze the received information, calculate a score based on the received information, determine a threshold, compare the calculated score with the determined threshold, authenticate the user and a device from which the data packet is received if the calculated score is greater than or equal to the determined threshold, and request low-quality information if the calculated score is less than the determined threshold.

Consistent with some embodiments, there is also provided a method for authenticating a user request for authentication. The method includes receiving, by an authentication device coupled to a network, the user request for authentication, computing, by the authentication device, a score based on information included in the user request, and determining, by the authentication device, a threshold. The method further includes determining, by the authentication device, if the computed score is greater than or equal to the determined threshold, and authenticating, by the authentication device, a user making the user request and a user device on which the user request was made if the computed score is greater than or equal to the determined threshold, and requesting, by the authentication device, low-quality information if the computed score is not greater than or equal to the determined threshold.

Consistent with some embodiments, there is further provided a non-transitory computer-readable medium having instructions for execution by one or more processors that, when executed, cause the one or more processors to perform a method for authenticating a request for authenticating a user and a device received over a network by a network interface component coupled to the one or more processors. The method includes receiving the user request for authentication, computing a score based on information included in the user request, and determining a threshold. The method further includes determining if the computed score is greater than or equal to the determined threshold, authenticating the user and the device if the computed score is greater than or equal to the determined threshold and requesting low-quality information if the computed score is not greater than or equal to the determined threshold.

These and other embodiments will be described in further detail below with respect to the following figures.

Figure 1:
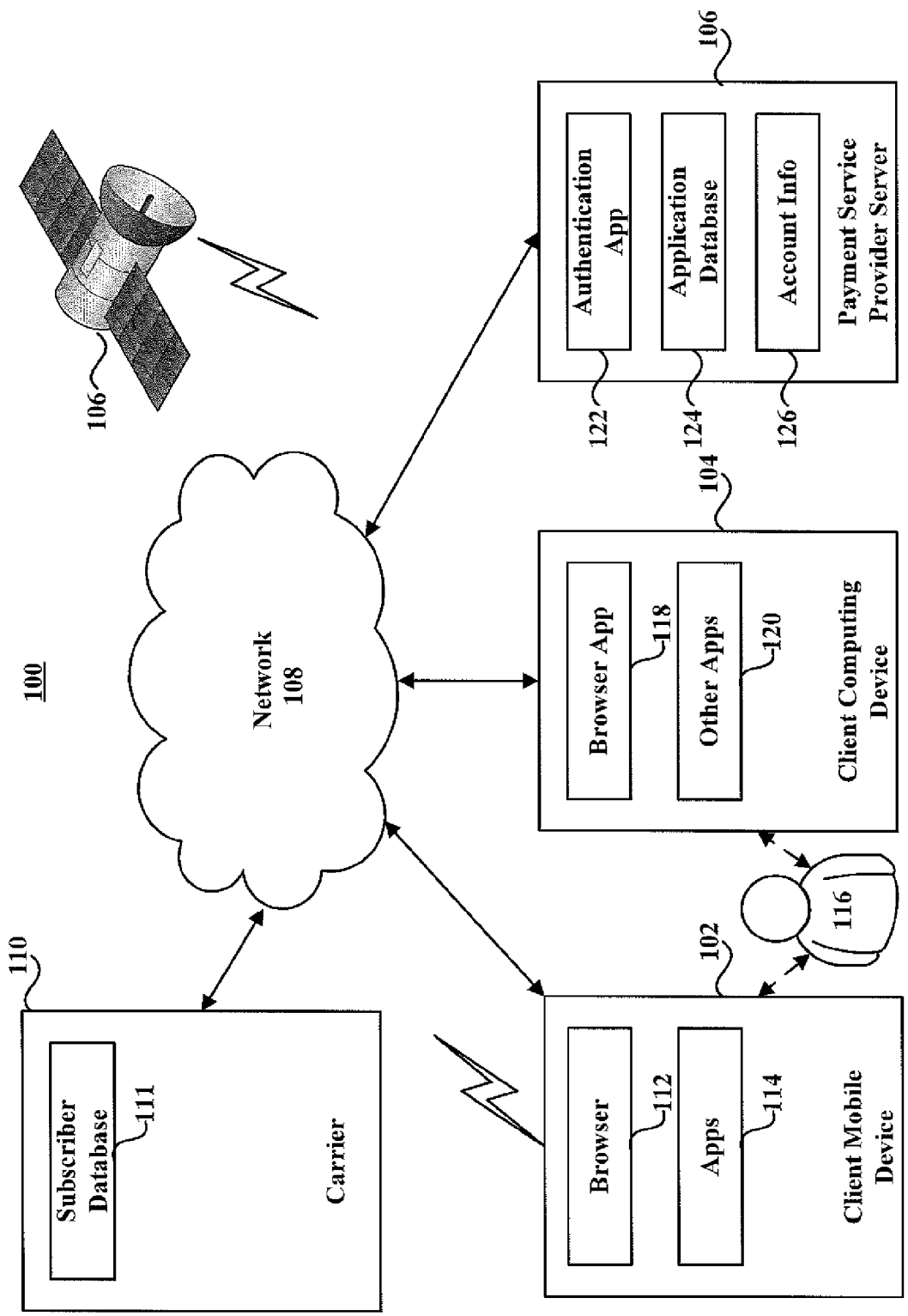
FIG. 1 is a block diagram of a networked system, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

FIG. 1 is a block diagram of a networked system 100, consistent with some embodiments. System 100 includes a client mobile device 102, a client computing device 104, and a payment service provider server 106 in communication over a network 108. Payment service provider server 106 may be maintained by a payment provider, such as PayPal, Inc. of San Jose, Calif. Server 106 may be maintained by other service providers in different embodiments. Payment service provider may be more generally a web site, an online content manager, a service provider, such as a bank, or other entity who provides content to a user requiring user authentication or login.

Network 108, in one embodiment, may be implemented as a single network or a combination of multiple networks. For example, in various embodiments, network 108 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet, as well as various cellular phone carriers, such as carrier 110 having a subscriber database 111.

Client mobile device 102, in one embodiment, may be implemented using any appropriate combination of hardware and/or software configured for wired and/or wireless communication over network 108. For example, client mobile device 102 may be implemented as a wireless telephone (e.g., smart phone), tablet, personal digital assistant (PDA), notebook computer, and/or various other generally known types of wired and/or wireless mobile computing devices. Consistent with some embodiments, client mobile device 102 may include any appropriate combination of hardware and/or software having one or more processors and capable of reading instructions stored on a non-transitory machine-readable medium for execution by the one or more processors. Consistent with some embodiments, client mobile device 102 includes a machine-readable medium, such as a memory (not shown) that includes instructions for execution by one or more processors (not shown) for causing client mobile device 102 to perform specific tasks. For example, such instructions may include displaying content, such as a web page or a user interface using a browser 112. Further, content may be content displayed by particular applications or "apps" 114 stored in a memory of client mobile device 102 and executed by one or more processors executing in client mobile device 102. Some common forms of machine-readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which one or more processors or computer is adapted to read.

As discussed above, client mobile device 102 may be a mobile device such as a smartphone such as an iPhone™ or other mobile device running the iOS™ operating system, the Android™ operating system, a BlackBerry™ operating system, Windows® Phone operating system, or webOS™. Client mobile device 102 may also be a tablet computer, such as an iPad™ or other tablet computer running one of the aforementioned operating systems. It should be appreciated that, in various embodiments, client mobile device 102 may be referred to as a user device or a customer/client device without departing from the scope of the present disclosure.

Consistent with some embodiments, browser 112 may be a mobile browser app, which may be used to provide a user interface to permit a user 116 to browse information available over network 108. For example, browser application 112 may be implemented as a web browser to view information available over network 108. Browser application 112 may include a software program, such as a graphical user interface (GUI), executable by one or more processors that is configured to interface and communicate with the payment service provider server 106 or other servers managed by content providers or merchants via network 108. For example, user 116 is able to access websites to find and purchase items, as well as access user account information or web content. User 116, through client mobile device 102, may also communicate with payment service provider server 106 to create an account, authenticate and/or log in to the account, and make a payment to a merchant or another individual connected to network 108.

Client mobile device 102, in one embodiment, may include other applications 114 as may be desired in one or more embodiments to provide additional features available to user 116, including accessing a user account with payment provider server 106. For example, applications 114 may include interfaces and communication protocols that allow the user to receive and transmit information through payment service provider server 106 and other online sites. Applications 114 may also include security applications for implementing client-side security features, programmatic client applications for interfacing with appropriate application programming interfaces (APIs) over network 108 or various other types of generally known programs and/or applications. Applications 114 may include mobile apps downloaded and resident on client mobile device 102 that enables user 116 to access content through the apps.

Client computing device 104, which can be similar to client mobile device 102, may be a separate device, such as a PC or laptop or netbook, or may be omitted if the user will be using only client mobile device 102. Both user devices may be used to access content with the payment service provider server 106 or other content provider. Client computing device 104, in one embodiment, may include a browser application 118 and other applications 120, similar to browser application 112 and applications 114 in client mobile device 102. Browser application 118 and applications 120 enable user 116 to access a payment provider web site and communicate with payment service provider server 106, as well as other online sites.

Payment service provider server 106 according to some embodiments, may be maintained by an online payment provider, which may provide processing for online financial and information transactions on behalf of user 116. Payment service provider server 106 may include at least one authentication application 122, which may be adapted to interact with client mobile device 102 and/or client computing device 104 over network 108 to authenticate requests to access accounts and purchase items, products and/or services by user 116. Payment service provider server 106 may be configured to maintain a plurality of user accounts in an account database 124, each of which may include or be separate from an account information 126 associated with individual users, including user 116. For example, account information 126 may include identity information of user 116, such as one or more full names, business names, street addresses, email addresses and phone numbers, website addresses, or other types of financial information, which may be used to facilitate online transactions for user 116, as well as user credentials such as user passwords and/or PINs. Further account information 126 may further include additional low-quality or low-entropy information about user 116 and client mobile device 102 and/or client computing device 104 that is collected by payment service provider server 106 when user 116 is authenticated by authentication app 122. Such low-quality or low-entropy information includes a location of user 116 when authenticated, an internet protocol (IP) address of client mobile device 102 or client computing device 104, carrier 110 that client mobile device 102 uses, a user agent or device identification (device ID) of client mobile device 102 or client computing device 104, and behavioral characteristics of user 116 as user interacts with client mobile device 102 and/or client computing device 104. As such, authentication application 122 may be configured to interact with a user 116 to authenticate the user through user credentials such as a password or PIN and automatically store the PIN and/or password and/or additional low-quality or low-entropy information about user 116 and client mobile device 102 and/or client computing device 104.

As shown in FIG. 1, system 100 may also include satellite 128 which may be in communication with any or all of client mobile device 102, client computing device 104, payment service provider server 106, and carrier 110. Consistent with some embodiments, satellite 128 may be a global positioning system (GPS) satellite in communication with client mobile device 102 for determining a location of client mobile device 102.

Figure 2:
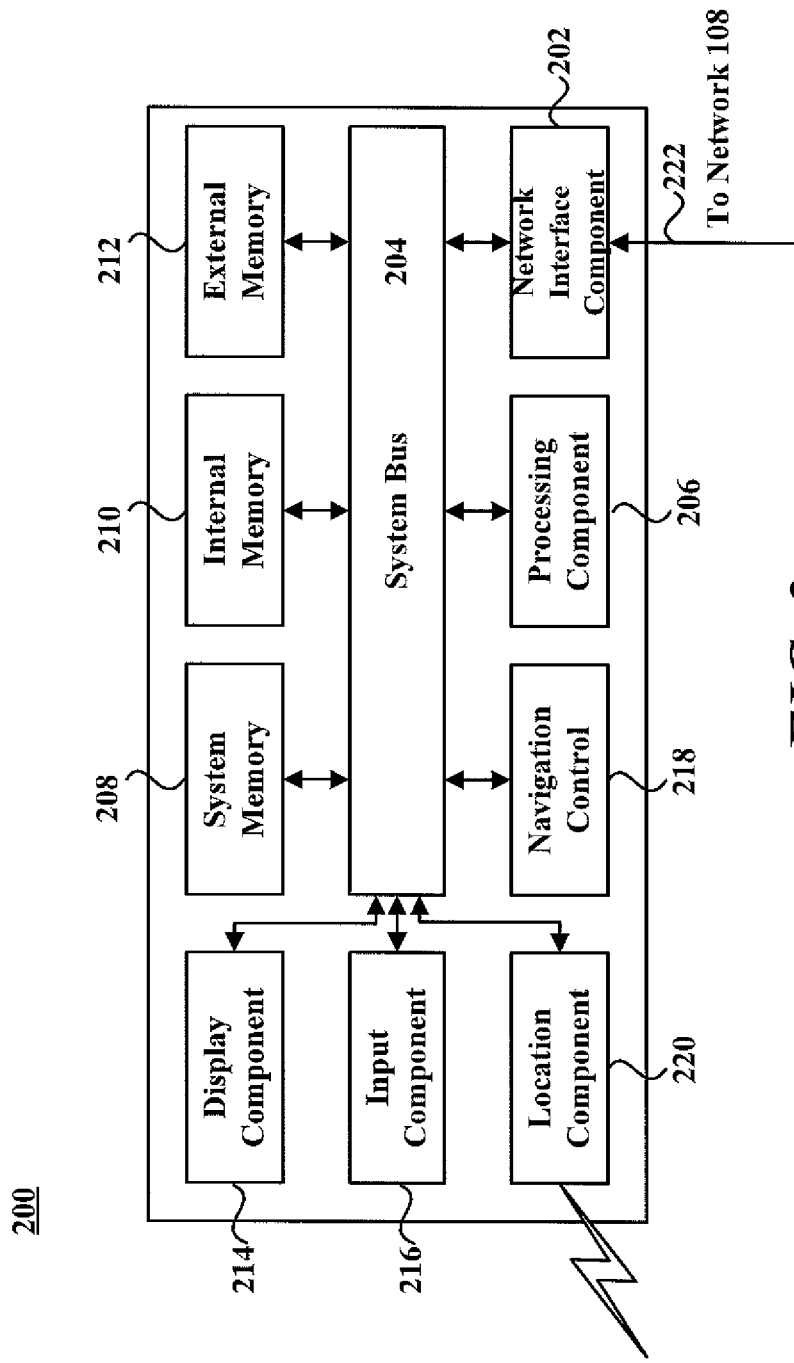
FIG. 2 is a diagram illustrating a computing system, consistent with some embodiments.

FIG. 2 is a diagram illustrating computing system 200, which may correspond to any of client mobile device 102, client computing device 104, or payment service provider server 106, consistent with some embodiments. Computing system 200 may be a mobile device such as a smartphone such as an iPhone™ or other mobile device running the iOS™ operating system, the Android™ operating system, a BlackBerry™ operating system, or webOS™, as would be consistent with client mobile device 102. Computing system 200 may also be a tablet computer such as the iPad™ or other similar device running the aforementioned operating systems. Computing system 200 may also be personal computer, laptop computer, netbook, or tablet computer as would be consistent with client computing device 104. Further, computing system 200 may also be a server or one server amongst a plurality of servers, as would be consistent with payment service provider server 106. As shown in FIG. 2, computing system 200 includes a network interface component (NIC) 202 configured for communication with a network such as network 108 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 108. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 108.

Consistent with some embodiments, computing system 200 includes a system bus 204 for interconnecting various components within computing system 200 and communication information between the various components. Such components include a processing component 206, which may be one or more processors, micro-controllers, or digital signal processors (DSP), a system memory component 208, which may correspond to random access memory (RAM), an internal memory component 210, which may correspond to read-only memory (ROM), and a external or static memory 212, which may correspond to optical, magnetic, or solid-state memories. Consistent with some embodiments, computing system 200 further includes a display component 214 for displaying information to a user 116 of computing system 200. Display component 214 may be an liquid crystal display (LCD) screen, an organic light emitting diode (OLED) screen (including active matrix AMOLED screens), an LED screen, a plasma display, or a cathode ray tube (CRT) display. Computing system 200 may also include an input component 216, allowing for a user 116 of computing system 200 to input information to computing system 200. Such information could include payment information such as an amount required to complete a transaction, account information, authentication information, or identification information. An input component 216 may include, for example, a keyboard or key pad, whether physical or virtual. Computing system 200 may further include a navigation control component 218, configured to allow a user to navigate along display component 214. Consistent with some embodiments, navigation control component 218 may be a mouse, a trackball, or other such device. Moreover, if device 200 includes a touch screen, display component 214, input component 216, and navigation control 218 may be a single integrated component, such as a capacitive sensor-based touch screen.

Consistent with some embodiments, computing system 200 may include a location component 220 for determining a location of computing system 220. In some embodiments, location component 220 may correspond to a GPS transceiver that is in communication with satellite 128. In other embodiments, location component 220 may be configured to determine a location of computing system by using an internet protocol (IP) address lookup, or by triangulating a position based on nearby mobile communications towers. Location component 220 may be further configured to store a user-defined location in any of system memory 208, internal memory 210, and/or external memory 212 that can be transmitted to a third party for the purpose of identifying a location of computing system 200.

Computing system 200 may perform specific operations by processing component 206 executing one or more sequences of instructions contained in system memory component 208, internal memory component 210, and/or external or static memory 212. In other embodiments, hard-wired circuitry may be used in place of or in combination with software instructions to implement the present disclosure.

Logic may be encoded in a computer readable medium, which may refer to any medium that participates in providing instructions to processing component 206 for execution. Such a medium may take many forms, including but not limited to, non-volatile media, volatile media, and transmission media. The medium may correspond to any of system memory 208, internal memory 210 and/or external or static memory 212. Consistent with some embodiments, the computer readable medium is non-transitory. In various implementations, non-volatile media include optical or magnetic disks, volatile media includes dynamic memory, and transmission media includes coaxial cables, copper wire, and fiber optics, including wires that comprise system bus 204. According to some embodiments, transmission media may take the form of acoustic or light waves, such as those generated during radio wave and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled by a communication link 222 to network 108 (e.g., such as a LAN, WLAN, PTSN, and/or various other wired or wireless networks, including telecommunications, mobile, and cellular phone networks) may perform instruction sequences to practice the present disclosure in coordination with one another.

Computing system 200 may transmit and receive messages, data and one or more data packets, information and instructions, including one or more programs (i.e., application code) through communication link 222 and network interface component 202. Communication link 222 may be wireless through a wireless data protocol such as Wi-Fi™, 3G, 4G, HSDPA, LTE, RF, NFC, or through a wired connection. Network interface component 202 may include an antenna, either separate or integrated, to enable transmission and reception via communication link 222. Received program code may be executed by processing component 206 as received and/or stored in memory 208, 210, or 212.

Figure 3:
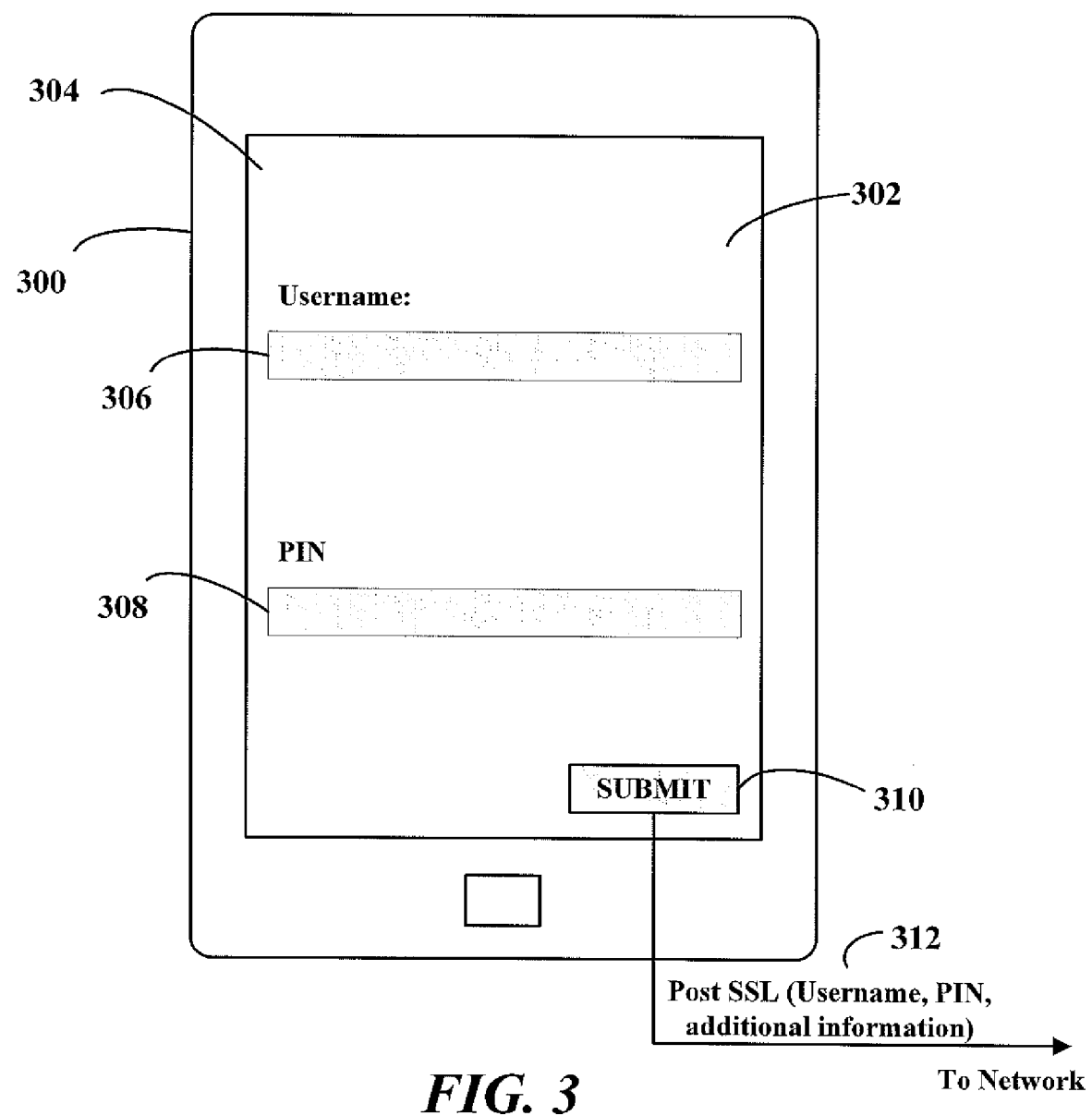
FIG. 3 is a figure illustrating a login screen, consistent with some embodiments.

FIG. 3 is a figure illustrating a login screen, consistent with some embodiments. As shown in FIG. 3, device 300 has a display 302 that may be configured to display a login screen 304, consistent with some embodiments. Device 300 may correspond to client mobile device 102, but also may correspond to client computing device 104. Moreover, device 300 may also correspond to computing system 200 shown in FIG. 2. Login screen 304 may request a user name 306 and credentials such as a personal identification number (PIN) 308. Consistent with some embodiments, PIN 308 may be an N-digit number that is known by the user and is associated with the user's account. In some embodiments, PIN 308 may be a PIN generated based on a password, as described in U.S. patent application Ser. No. 13/281,273, filed on Oct. 25, 2011, which is assigned to the same entity as this application and is incorporated by reference herein in its entirety. Alternatively, login screen 304 may request an alphanumeric password. Consistent with some embodiments, username 306 may be remembered by device 300 and may be automatically filled upon accessing login screen 304.

Login screen 304 may require additional information, consistent with some embodiments. Login screen 304 may be a login screen provided by a payment service provider such as PayPal, Inc. of San Jose, Calif. Login screen 310 may further include a "submit" button 310 which, when selected, posts username 306 and PIN 308 to network 108. According to some embodiments, submit button 310 may be selected by touch the displayed submit button 310 on a touch screen device, such as client mobile device 102. In other embodiments, submit button 310 may be activated by navigating to button 310 with navigation control 218, such as a trackball, mouse, or cursor-moving device and then pressing a physical button on client mobile device 102 or client computing device 104.

Consistent with some embodiments, additional information may be posted to network 108 by selecting submit button 310. For example, the additional information may include high-quality information such as a cookie, or a local object such as a FlashObject. The additional information may also include low-quality or low-entropy information such as an IP address of device 300, a device identification (ID) of device 300, or a location of device 300. The posted username 306, PIN 308, and additional information may collectively be considered as at least one data packet 312 that is posted to network 108. Consistent with some embodiments, at least one data packet 312 may be posted to network using secure sockets layer (SSL) transmission. According to some embodiments, at least one data packet 312 may be posted to network 108 to log in to payment service provider server 106 or to otherwise provide authentication credentials to payment service provider server 106 in order to make a payment, receive a payment, or otherwise authorize a transaction or other action to be made in accordance with user's 116 account with the payment service provider. Further, at least one data packet 312 may be a single data packet including username 306, PIN 308, and additional information, or may be multiple data packets including this and other information.

Consistent with some embodiments, payment service provider server 106 requires the additional information in order to authenticate user 116 and device 300, as the additional information provides an additional layer of security, which may be nothing more than a deterrent, over a simple username and PIN authentication. For example, if PIN 308 is simply an arrangement of 4 numbers chosen by user 116 or assigned by payment service provider server 106, an attacker may be able to try the same PIN with many different usernames in the hope that one will work, in a so-called "vertical attack" as described above. Alternatively, an attacker that has obtained a username and password of user 116 may try to authenticate user's 116 account with the payment service provider from the attacker's device. Requiring additional information about user 116 and/or device 300 can limit and/or deter both of these types of attacks. This required additional information may be the cookie and/or local object stored on device 300, discussed above. Consistent with some embodiments, the cookie and/or local object may be stored in a memory of device 300 upon an initial successful authentication with payment service provider server 106. The cookie and/or local object will provide evidence to payment service provider server 106 that user 116 and device 300 have been previously authenticated and, in most cases, performing a permitted authentication with payment service provider server 106. Consistent with some embodiments, the cookie and/or local object may have an associated time stamp that payment service provider server 106 checks so that the cookie and/or local object are periodically refreshed/replaced.

User 116, however, may wish to authenticate to payment service provider server 106 via multiple devices 300, such as both a client mobile device 102 and client computing device 104. Alternatively, user 116 may purchase a new device or wish to authenticate to payment service provider server from a friend's or relative's device. In each of these instances, the devices will not have the cookie and/or local object stored therein, making it difficult for user 116 to authenticate to payment service provider server 106. In such cases, a user may be able to provide low-quality or low-entropy information in lieu of the cookie and/or local object in order to authenticate with payment service provider server 106, as described in FIG. 4, below.

Figure 4:
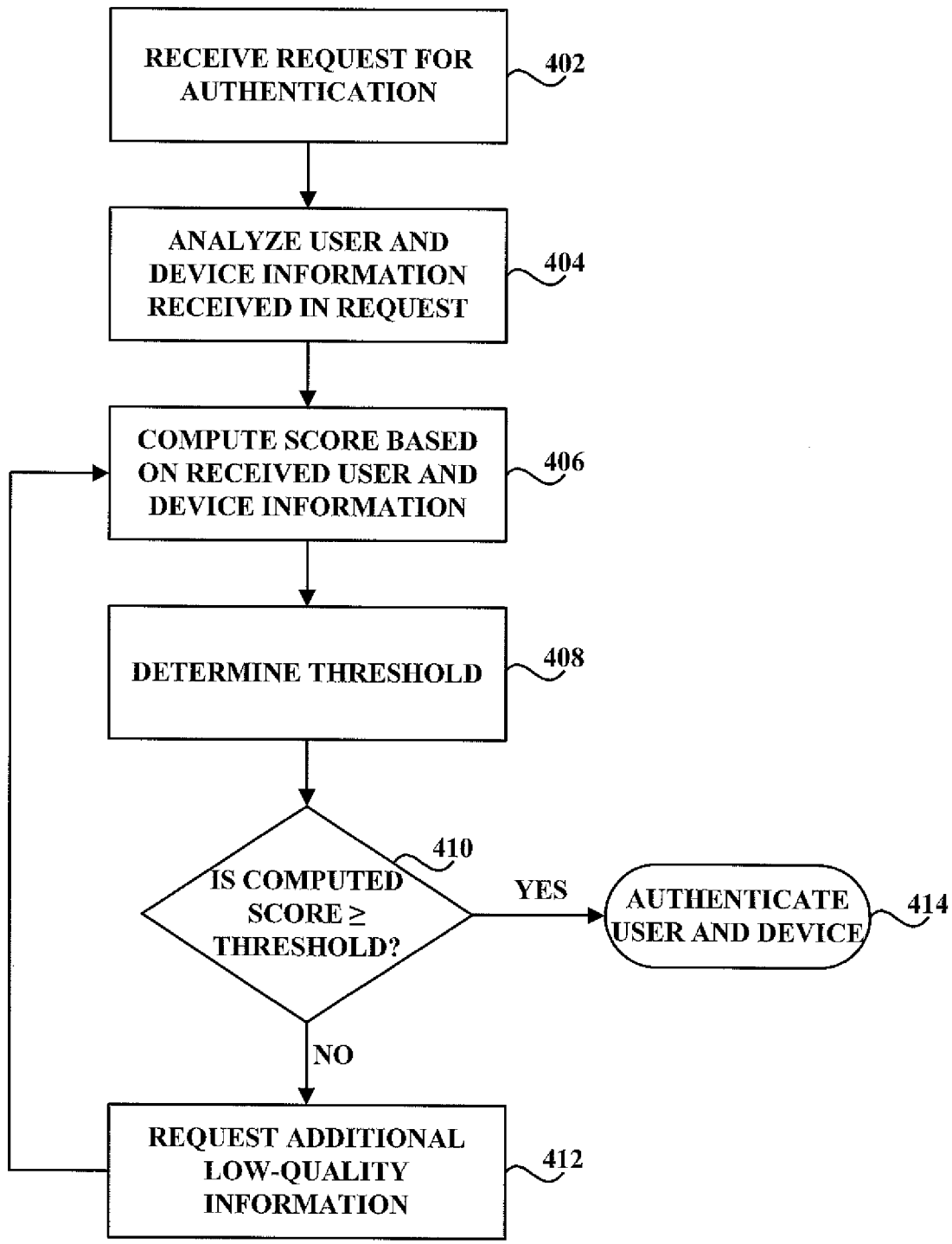
FIG. 4 is a flowchart illustrating a method for authenticating a user or device, consistent with some embodiments.

FIG. 4 is a flowchart illustrating a method for authenticating a user or device, consistent with some embodiments. For the purpose of illustration, the method shown in FIG. 4 will be described with reference to FIGS. 1-3. The method shown in FIG. 4 may be implemented by authentication application 122 running on payment service provider server 106. In particular, the method shown in FIG. 4, may correspond to computer-readable instructions stored in a memory of payment service provider server 106 that, when executed by one or more processors of payment service provider server 106 causes the one or more processors to perform the method. In general, however, the method shown in FIG. 4 may be performed on any device capable of authenticating a user request for authentication, generally referred to as an authentication device, that includes the hardware and computer-readable instructions for performing the method shown in FIG. 4. As shown in FIG. 4, the method begins by receiving a request for authentication (402). Consistent with some embodiments, the request for authentication may be transmitted by a device such as client mobile device 102 or client computing device 104, each of which may correspond to computing system 200 or device 300. The request for authentication may be transmitted to network 108 and received by payment service provider server 106. Consistent with some embodiments, the request for authentication may correspond to at least one data packet 312 sent by device 300 that includes user and device information that may include at least a username 306 and user credentials such as a PIN 308 as well as additional information. The received user and device information is then analyzed (404). In some embodiments, payment service provider server 106 performs the information analysis. In other embodiments, additional processing devices coupled to payment service provider server 106 (not shown) may perform the information analysis. The analysis of the received user and device information may include reviewing the type of information received, filtering out redundant or unnecessary information, or analyzing the received user and device information to determine the presence or absence of a particular kind of information. In some embodiments, the analysis of the user device and information may include determining if the received username 306 and user credentials match a username 306 and user credentials for a particular account in account information 126 of payment service provider server 106. In such embodiments, the method shown in FIG. 4 may terminate when username 306 and user credentials do not match with the username 306 and credentials in account information 126 of payment service provider server 106.

After analyzing the received user and device information, a score is computed based on the received user and device information (406). Consistent with some embodiments, the score is computed by payment service provider server 106 but, in some other embodiments, the score may be computed by additional processing devices coupled to payment service provider server 106 (not shown). The score may be computed by assigning a weight or number to the additional information received in at least one data packet 312. For example, if at least one data packet 312 includes a cookie indicating that user 116 and device 300 have previously been authenticated by payment service provider server 106, the cookie may be assigned a relatively high score. Similarly, if at least one data packet 312 includes a local object such as a FlashObject previously assigned by payment service provider server 106 upon a successful authentication, the local object may also be assigned a relatively high score.

After the score has been computed, a threshold is determined (408). Consistent with some embodiments, the threshold is dependent on user 116. For example, if user 116 has interacted with the payment service provider that maintains server 106 in the past, these past interactions, stored in account information 126, may be consulted in order to determine the threshold. If user 116 has previously had fraudulent activity on their account, the threshold may be higher than that for a user having no fraudulent activity. Other factors that may be used in order to determine the user-dependent threshold include credit scores, current location of user in comparison to known home location or previous location, recent successful or failed interactions with the payment service provider, and complaints lodged against user 116 with the payment service provider. The factors that may be used to determine the user-dependent threshold may also include contextual-based factors that factor in the context in which user 116 is currently attempting to authenticate with payment service provider server 106. For example, if user 116 is attempting to authenticate with payment service provider server 106 in order to send a payment to an individual with whom user 116 has previously performed a transaction with, the user-dependent threshold may be lower than it would be if the authentication is to send a payment to an individual with whom user 116 has not previously performed a transaction with. For authorization requests for performing a transaction between a payer and a payee using payment service provider server 106, additional factors that may be considered in determining the user-dependent threshold include the trustworthiness of the payer and payer, and the user history, stored in account information 126, of both payer and payee. Such account information may include volume of transactions, complaints, how long the payer or payee has been active.

After the threshold is determined, the computed score is compared with the determined threshold (410). If the computed score is determined to be less than the threshold, payment service provider server 106 may request additional low-quality or low-entropy information (412). Consistent with some embodiments, the request for low-quality information requires, in response, the user to enter low-quality information, or the user to perform additional authentication, or the user to perform a specified action, or the user to execute a specific program on the device such as a anti-virus or anti-malware application, or a response from a third party, or a scan of a device performed by a third party or payment service provider server 106. Low-quality or low-entropy information includes information that when taken alone would be insecure authentication information but, when taken in combination with more high-quality or high-entropy authentication information, can add security to an authentication request. At the very least, the additional low-quality or low-entropy information requested by payment service provider server may act as a deterrent to would be attackers. The low-quality or low-entropy information may include information that is provided by user 116, client mobile device 102 or client computing device 104, from payment service provider 106, or from carrier 110. For example, low-quality or low-entropy information that may be provided by user 116 include a time-stamped photo of user 116 taken by, for example, client mobile device 102. Low-quality or low-entropy information that may be provided by client mobile device 102 (or client computing device 104) may further include an internet protocol (IP) address, a user agent or device identification (device ID), the service provider (e.g., carrier 110) that client mobile device 102 is currently operating on, a current location determined by location component 220, biometric information of user 116, a short password or recovery PIN entered by user 116, or behavioral characteristics of user 116. Behavioral characteristics may include information related to how user 116 interacts with client mobile device 102, such as how user 116 accesses data from client mobile device 102, how user 116 swipes the screen of client mobile device 102, or accelerometer data captured by client mobile device 102. Low-quality or low-entropy information that may be provided by carrier 110 may include an International Mobile Equipment Identity (IMEI) number of client mobile device 102, an International Mobile Subscriber Identity (IMSI) number associated with client mobile device 102, a Mobile Equipment Identifier (MEID) number associated with client mobile device 102, the IP address of client mobile device 102, a location of client mobile device 102, or personal information stored in subscribe database 126 of user 116. Low-quality or low-entropy information that may be provided by, or in this case retrieved by, payment service provider server 106 includes information concerning user 116 that may be stored in account information 126 and, in some embodiments, may be compared with low-quality or low-entropy information provided from client mobile device 102 (or client computing device 104) or carrier 110 to determine if the provided low-quality or low-entropy information is indicative of information that would be provided by user 116. For example, in one embodiment, payment service provider server 106 may retrieve an e-mail address associated with user 116 stored in account information 126 and send an e-mail to the listed e-mail address containing a hyperlink for user 116 to follow to enter additional low-quality or low-entropy information or that will allow payment service provider server 106 to automatically collect low-quality or low-entropy information about user 116 and device 300. The additional low-quality or low-entropy information that is collected by payment service provider server 106 may be stored in account information 126 for future use.

After receiving the additional low-quality or low-entropy information, the score will again be computed based on the additional information (406), the threshold will be determined (408), and the computed score will be compared against the determined threshold (410). If the computed score is greater than or equal to the threshold, user 116 and device 300 is authenticated (414). Authentication of user 116 and device 300 may include the transmission of a cookie or a local object such as a FlashObject from payment service provider server 306 to device 300 (which may correspond to client mobile device 102 or client computing device 104). Consistent with some embodiments, the presence of a cookie or local object in data packet 312 may provide a sufficient score to authenticate user 116 and device 300 so that they do not need to provide additional low-quality or low-entropy information when attempting a successive authentication.

According to some embodiments, if a computed score is not greater than or equal to a determined threshold (410) even after receiving additional low-quality or low-entropy information, user 116 and device 300 may be authenticated but flagged as having limited authentication. In such embodiments, having limited authentication may allow only certain actions to be performed when interacting with payment service provider server 106.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide systems and methods for authenticating a user by determining if the request includes sufficient information to meet or surpass a user-based threshold and, if the request does not include sufficient information, requesting additional low-quality or low-entropy information from the user until the user-based threshold is met. Such systems and methods may provide an additional security for users by providing a deterrent to would-be attackers using brute-force attacks. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:
1. An authentication device, comprising:
a network interface component coupled to a network and configured to receive:
at least a first data packet having authentication information, the authentication information comprising at least a username of a user and user credentials; and
at least a second data packet having low-quality information in response to a request for low-quality information;
a memory coupled to the network interface component and configured to store the received authentication information, one or more instructions for authenticating the user based on the received authentication information, and account information of the user; and
one or more processors configured to:
analyze the received authentication information;
calculate a first score based on the received authentication information when the authentication information is received;
determine a threshold;
compare the calculated score with the determined threshold when the authentication information is received;
authenticate the user and a device from which the first data packet is received when the calculated first score is greater than or equal to the determined threshold;
generate the request for low-quality information when the calculated score is less than the determined threshold;
calculate a second score based on the received low-quality information when the computed first score is not greater than or equal to the determined threshold and the network interface component receives low-quality information;
compare the second score to the determined threshold; and
authenticate the user and the device from which the first data packet is received when the second score is greater than or equal to the determined threshold;
wherein the request for low-quality information comprises a request that the device undergo a scan.

2. The device of claim 1, wherein the processor is further configured to calculate the first score to be greater than the determined threshold when the received information includes information indicative of a recent previous authentication of the user and the device.

3. The device of claim 1, wherein the one or more processors are further configured to determine the threshold based on the account information of the user.

4. The device of claim 1, wherein the request for low-quality information requires, in response, at least one of: the user to enter low-quality information; the user to perform additional authentication; the user to perform a specified action; the user to execute a specific program on the device; a response from a third party; or a scan of a device.

5. The device of claim 1, wherein the low-quality information comprises at least one of an internet protocol (IP) address of a user device on the network from which the received data packet was received, a device identification (ID) of the user device, a geographical location of the user device, or biometric information of the user.

6. The device of claim 1, wherein the authentication device comprises a payment service provider server.

7. A method for processing a user authentication request, comprising:
receiving, by an authentication device coupled to a network, the user authentication request;
computing, by the authentication device, a first score based on information included in the user authentication request when the user authentication request is received, the information included in the user authentication request including at least a username and user credentials;
determining, by the authentication device, a threshold;
authenticating, by the authentication device when the user authentication request is received, a user making the user authentication request and a user device on which the user authentication request was made when the computed first score is greater than or equal to the determined threshold;
requesting, by the authentication device, low-quality information when the computed first score is not greater than or equal to the determined threshold;
computing, by the authentication device, a second score based on the information included in the user authentication request and received low-quality information when the computed first score is not greater than or equal to the determined threshold and the authentication device receives low-quality information;
comparing, by the authentication device, the second score to the determined threshold; and
authenticating, by the authentication device, the user and the user device when the second score is greater than or equal to the determined threshold;
wherein requesting low-quality information comprises requesting that the user device undergo a scan.

8. The method of claim 7, further comprising:
analyzing, by the authentication device, the information included in the user authentication request; and
rejecting the user authentication request if the information does not match user information stored in the authentication device.

9. The method of claim 7, wherein the user credentials comprise at least one of a password and a personal identification number (PIN).

10. The method of claim 7, wherein requesting low-quality information comprises at least one of:
requesting low-quality information from a user making the user authentication request;
requesting low-quality information from a device from which the user made the user authentication request;
requesting low-quality information from a mobile carrier to which the device and the user are subscribed; or
requesting low-quality information from a memory in the authentication device storing low-quality information about the user and the device.

11. The method of claim 7, wherein the low-quality information comprises at least one of an internet protocol (IP) address of a device from which a user made the user authentication request, a device identification (ID) of the device, a geographical location of the device, or biometric information of the user.

12. The method of claim 7, wherein determining a threshold comprises determining a threshold based on information related to a user making the user authentication request.

13. The method of claim 7, wherein the computed first score is greater than or equal to the determined threshold when the information included in the user authentication request includes an object that indicates a previous successful authentication of the user making the user authentication request and the device on which the user authentication request is made.

14. A non-transitory computer-readable medium having instructions for execution by one or more processors that, when executed, cause the one or more processors to perform a method for processing a user authentication request for authenticating a user and a device received over a network by a network interface component coupled to the one or more processors, the method comprising:
receiving the user authentication request for authentication;
computing a first score based on information included in the user authentication request when the user authentication request is received, wherein the information included in the user authentication request comprises a user name and user credentials;
determining a threshold;
authenticating, when the user authentication request is received, the user and the device when the computed first score is greater than or equal to the determined threshold;
requesting low-quality information when the computed first score is not greater than or equal to the determined threshold computing a second score based on the information included in the user authentication request and received low-quality information when the computed first score is not greater than or equal to the determined threshold and the low-quality information is received;
comparing the second score to the determined threshold; and
authenticating the user and the device when the second score is greater than or equal to the determined threshold;
wherein requesting low-quality information comprises requesting that the device undergo a scan.

15. The method of claim 14, wherein the computed first score is greater than or equal to the determined threshold when the information included in the user authentication request includes an object that indicates a previous successful authentication of the user making the user authentication request and the device.

16. The method of claim 14, wherein the additional low-quality information comprises at least one of an internet protocol (IP) address of the device, a device identification (ID) of the device, a geographical location of the device, or biometric information of the user.

17. The method of claim 14, wherein determining the threshold comprises determining the threshold based on past authentication requests made by the user and contextual information related to the user authentication request.

18. The method of claim 17, wherein the contextual information comprises a type of transaction requiring authentication.

19. The method of claim 14, wherein the user credentials include at least one of a password and a personal identification number (PIN).

* * * * *